Oct. 19, 1954    R. A. MELATO    2,692,151
FLUID LINE COUPLING MEANS
Filed June 12, 1952    2 Sheets-Sheet 1

*INVENTOR.*
RAYMOND A. MELATO
BY
ATTORNEY

Oct. 19, 1954 — R. A. MELATO — 2,692,151
FLUID LINE COUPLING MEANS
Filed June 12, 1952 — 2 Sheets-Sheet 2
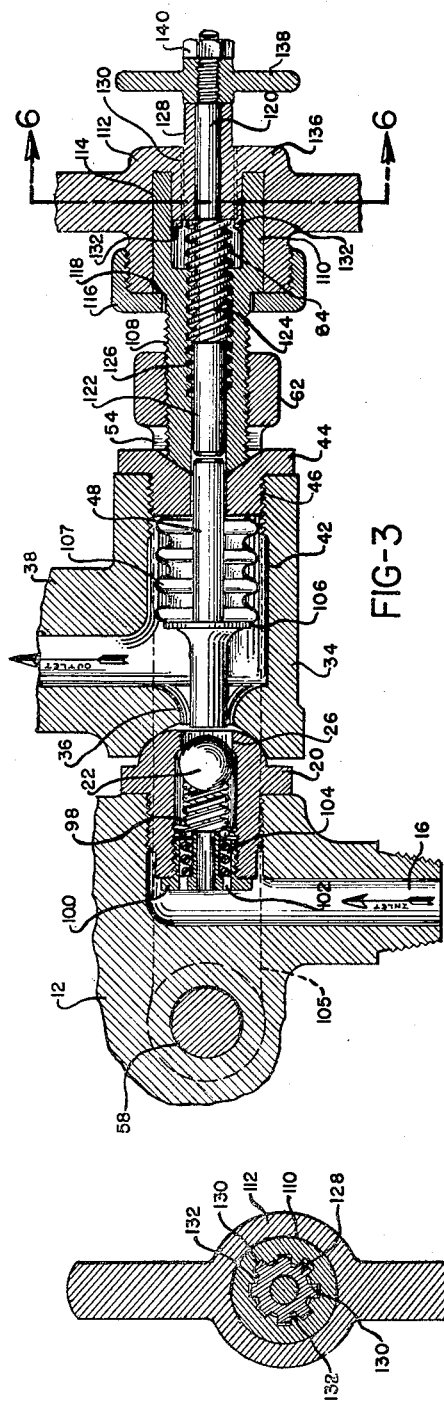
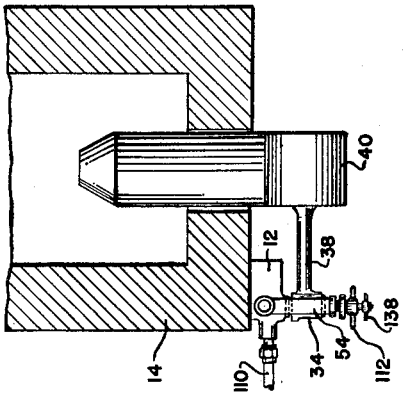
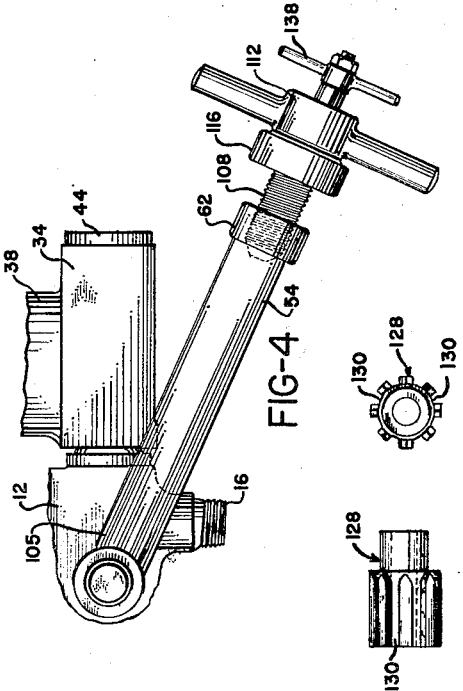
INVENTOR.
RAYMOND A. MELATO
BY
ATTORNEY Patented Oct. 19, 1954

2,692,151

UNITED STATES PATENT OFFICE 2,692,151

FLUID LINE COUPLING MEANS

Raymond A. Melato, York, Pa.

Application June 12, 1952, Serial No. 293,140

9 Claims. (Cl. 284—17)

This invention relates to a separable coupling for a fluid supply line having interfitting portions arranged to be clamped in fluid-tight relationship. The invention is adapted for use in numerous types of fluid supply lines but, by way of example, one specific use is in conjunction with a fuel supply line for a fuel burner such as an oil burner. In fluid supply lines and particularly fuel supply lines, it is conventional practice to install a shut-off valve which should be closed before the line is separated at any position in the line connecting with the outlet end of said shut-off valve. If the shut-off valve is closed before the line is separated, no appreciable leakage of fluid will occur.

In situations where a fluid supply line conducts fuel to a burner such as an oil burner, it is not only desirable to close a shut-off valve in the supply line prior to disconnecting a fuel burner from said line for purposes of conserving fuel but it is also expedient to shut off the fuel supply for safety reasons to prevent accidental fire hazards from arising. Under these circumstances, however, the human element must be relied upon to close a shut-off valve and should an operator or repairman neglect to close the shut-off valve prior to disconnecting the burner from the fuel line, for example, not only will fuel be wasted but an accidental fire may result with consequent injury to both the operator and the equipment. Similar situations arise in fluid supply lines carrying combustible or otherwise dangerous fluids, either liquid or gaseous.

It is an object of the present invention to provide a separable coupling for clamping two interfitting members or portions of a fluid supply line, one of said members having an automatically operable check-type valve which will function automatically to shut off the supply of fuel before said members are separated.

It is another object of the invention to arrange said automatic shut-off or check-type valve in one of said members close to the exit thereof so as to minimize the amount of fluid left in said member upon the other supply line member being separated therefrom.

It is a further object of the invention to provide means for clamping said supply line members or portions together and include with such clamping means a check valve operating mechanism.

Ancillary to the foregoing object, it is a still further object to arrange said check valve operation mechanism so that it cannot be operated to open said valve until the fluid line members are clamped securely in operative position and, conversely, said fuel line members cannot be unclamped to permit separation thereof until said check valve operating mechanism has been actuated to permit said check valve to close automatically.

Still another object of the invention is to provide a clamping mechanism for said fluid line members and arrange an actuator therefor, interlocking mechanism also being provided selectively to render said actuator effective or ineffective so as to permit said actuator either to operate said clamping means to clamp said fluid line members together or unclamp them to effect separation thereof, said interlocking mechanism also being arranged to interengage the check valve to move it to open position only when the interlocking mechanism is positioned to render the actuator ineffective, whereby fluid may only pass through said members when securely clamped together and, if it is desired to separate said fluid line members, movement of the interlocking mechanism to connect effectively the actuator with the clamping means, so as to permit unclamping said members, will first cause the check valve to close.

It is one further object of the invention to provide several embodiments of interlocking mechanism by which the actuator for the clamping means may be rendered either effective or ineffective.

Details of the foregoing objects and of the invention as well as other objects thereof are set forth in the following specification and illustrated in the accompanying drawings forming a part thereof.

In the drawings:

Fig. 3 is a sectional plan view of another exemplary embodiment of the invention, this view being sectioned similarly to Fig. 1 but illustrating the check valve in closed position and the clamping means arranged with its actuator rendered effective by the interlocking mechanism to operate the clamping means.

Fig. 4 is an exterior top plan view in smaller scale than Figs. 1 and 3 and illustrating the clamping means moved to a position wherein the members of the fluid supply line may be operated.

Fig. 5 is an illustration, on a still smaller scale than Fig. 4, of the present invention applied to an exemplary fuel burner and the supply line thereof.

Fig. 6 is a sectional view taken on the line 6—6 of Fig. 3.

Fig. 7 is a side elevation of one component of the invention shown in Fig. 3.

Fig. 8 is an end elevation of its component shown in Fig. 7.

Figure 1:
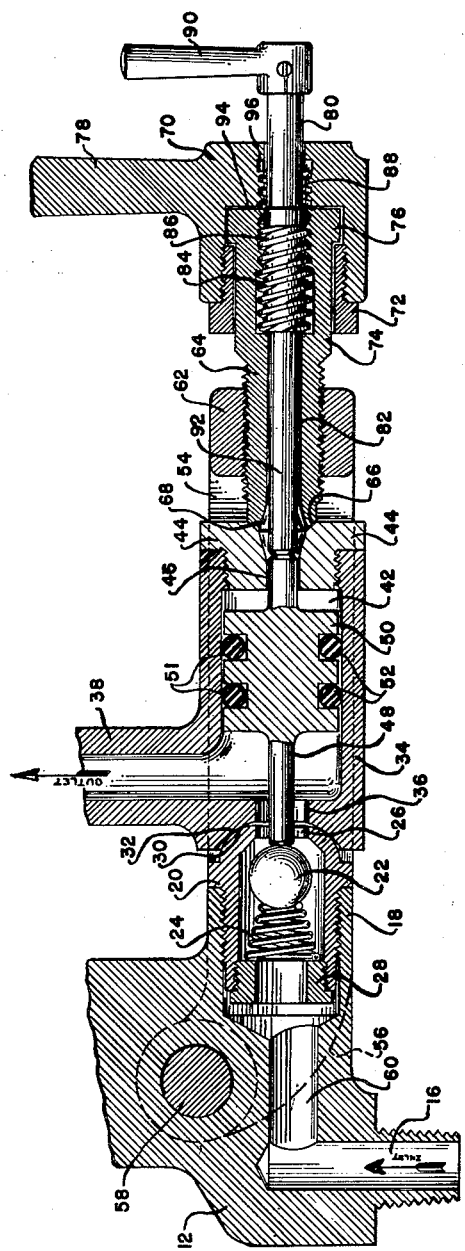
Fig. 1 is a sectional plan view of one exemplary embodiment of the invention, the interlocking mechanism in this view being shown in position to hold the check valve open, the fluid line members being in clamped position.

As has been stated above, the present invention applies to a separable coupling for clamping together two members or portions of a fluid supply line and the invention is capable of being utilized in supply lines having general application in a variety of arts where it is desired to separate said supply line and prevent undue leakage or escape of fluid from the line when one part of the line is separated from another part. To facilitate the description and illustration of the invention, a portion of an exemplary fuel supply line is illustrated, said fuel supply line being adapted to supply fuel to an exemplary oil burner shown in Fig. 5. Several embodiments of the invention are illustrated in the drawings.

Referring to Figs. 1 and 5, a fluid supply line 10 is arranged to be connected to a supply line member 12 which may, for example, be firmly attached to a stationary part of the exterior of a furnace 14 as shown in Fig. 5, or attached directly to a part of a burner unit, now shown. An inlet port 16 is provided in member 12 and communicates with an outlet portion 18 of said member. A check valve housing 20 is threaded into the outlet portion 18 as shown in Fig. 1 and a suitable valve ball 22 or plug type valve, not shown, is constantly urged within said housing, by a compression spring 24, toward the circular outlet port 26 of the housing 20. An annular collar 28 is threaded into the inlet end of housing 20 to provide a seat for the spring 24. The exterior of the housing 20 is provided with a small hemispherical end 30 which interfits in fluid-tight relationship with a concave seat 32, or any other suitable type union seat, in a second fluid line member 34 having an inlet port 36 arranged to be axially aligned with outlet port 26 of member 12 when interfitting portions 30 and 32 are arranged in operative position. As is clearly shown in Fig. 1 especially, the radius of surface 30 is less than that of surface 32, whereby when said surfaces are in operative contact, there preferably is only substantially a line contact between the two surfaces. Thus, even if extraneous foreign matter happens to be on one surface or the other, engagement between said surfaces will serve automatically to clear the connection of such foreign matter.

Second member 34 has an outlet 38 which may directly be connected to the inlet of the fuel burner 40, or said member may be part of the burner unit per se. Member 34 also has a preferably cylindrical chamber 42 communicating with the outlet 38. The outer end of second member 34 has a plug 44 threadably connected thereto, said plug having a cylindrical bearing 46. Disposed within second member 34, and longitudinally movable of chamber 42 therein, is a valve engaging rod or member 48. One end of the member 48 is reciprocable within bearing 46 and the other end thereof is arranged to engage ball 22 when member 48 is moved to the left as viewed in Fig. 1.

It is desirable to provide a fluid seal between member 48 and cylindrical chamber 42 so that no fluid may escape through bearing 46. One type of suitable fluid seal is shown in Fig. 1, wherein the intermediate portion of member 48 comprises a piston 50 slidable within chamber 42. Annular grooves 51 in the piston walls contain O-rings 52 which slidably engage the walls of chamber 42 to prevent the passage of any fluid past the piston. It will be obvious of course that other suitable sealing means may be used such as a flexible bellows, illustrated and described hereinafter, or a suitable stuffing box. The spring 24 is of sufficient strength so as to permit the check valve to close when valve-opening force upon member 48 is released as described hereinafter.

Clamping means for securing the second member 34 to member 12 comprise a yoke 54, the ends 56 of the legs of the yoke having bearings to receive the opposite ends of a pintle forming pin 58 which extends through member 12 as shown in Fig. 1. For convenience, the ends 56 may be slightly curved as shown in Fig. 1 so that pin 58 will not interfere with the conduit opening 60 in member 12. The bight portion 62 of the yoke is threaded to receive a threaded clamping member 64, the inner end 66 of which is preferably formed so as to be complementary to a seat 68 in the outer end of plug 44. The yoke 54 and clamping member 64 comprises the clamping means for securing second member 34 clamped to member 12 of the supply line.

Clamping member 64 is arranged to be manually operated by an actuator 70 which has a sleeve 72 threadably connected thereto, said sleeve being rotatable about cylindrical portion 74 of clamping member 64. Cylindrical portion 74 terminates within actuator 70 in an annular collar 76 which loosely abuts the inner end of sleeve 72 to prevent appreciable longitudinal movement of the actuator 70 relative to clamping member 64. However, the actuator 70 is freely swivelled on the clamping member 64 when other portions of the mechanism, to be described, are arranged as shown in Fig. 1. In Fig. 1, the actuator 70 is shown in its ineffective position relative to clamping member 64. For convenience, actuator 70 is also provided with a manually operable handle 78.

An interlock or interlocking mechanism comprising a shaft 80 is rotatably mounted within an opening 82 extending longitudinally through clamping member 64. A portion of shaft 80, intermediately of the ends thereof, is provided with threads 84, preferably of the Acme type, which cooperate with complementary threads 86 and 88 respectively formed in the end of clamping member 64 and a portion of the interior of actuator 70 as clearly shown in Fig. 1. An operating handle 90 is fixed to the outer end of shaft 80 and the other end 92 of shaft 80 comprises a valve actuating means which is arranged to abut one end of member 48 when shaft 80 is rotated in a right hand or valve actuating direction, it being assumed that the threads 84, 86 and 88 are right hand threads.

When the shaft 80 is rotated in a left hand direction by the handle 90, the shaft 80 will be moved to the right as viewed in Fig. 1 and the threads 84 thereon will not only engage the threads 86 in clamping member 64 but will also engage threads 88 in actuator 70 and a collar 94, which is fixed to shaft 80, will abut a stop flange 96 in actuator 70 to limit the outward movement of shaft 80. When the above described operation is completed, actuator 70 will be rendered effective, by being locked or clamped to clamping member 64, to cause rotation of locking member 64 within the bight 62 of the yoke in either direction, thereby permitting the clamping member 64 to be moved for example from engagement with plug 44 of second member 34. It will be understood of course that the outward or interlocking movement of shaft 80 will cause the other end 92 thereof to disengage valve engaging member 48 and thereby permit spring 24 to move valve ball 22 into valve closing position, similar to the position of the valve ball illustrated in Fig. 3 relative to another embodiment of the invention to be described.

When the clamping member 64 has been moved from its clamping position as aforesaid, the yoke 54 may be swung from its clamping position to the position of the yoke shown in Fig. 4 relative to another embodiment to be described, it being clear from said view that the second fluid line member 34 may then readily be separated from the other or fixed supply line member 12. However, such separation cannot take place until the valve ball 22 has first been seated in valve closing position.

In situations where the present invention is to be used in conjunction with a fuel burner, the interlocking mechanism comprising shaft 80 will first be moved from a valve opening position illustrated in Fig. 1 to a valve closing position and, in the preferred operation of the mechanism, the actuator 70 and clamping member 64 will not be operated until the fuel remaining in the supply line between the burner and the check valve has been exhausted. The actuator 70 may then be rotated to move the clamping member 64 from engagement with the second fluid line member 34.

It is also preferred that the threads 84, 86 and 88 be of a multiple thread type so as to expedite the movement of the interlocking shaft 80 between its effective and ineffective positions for either respectively fixedly connecting or disconnecting the actuator 70 relative to the clamping member 64. In the illustration shown in Fig. 1, these threads are shown as triple threads and it will be appreciated that longitudinal movement of the interlock shaft 80 will take place in a rapid manner even though only several rotations of the shaft are made by the handle 90.

Figure 2:
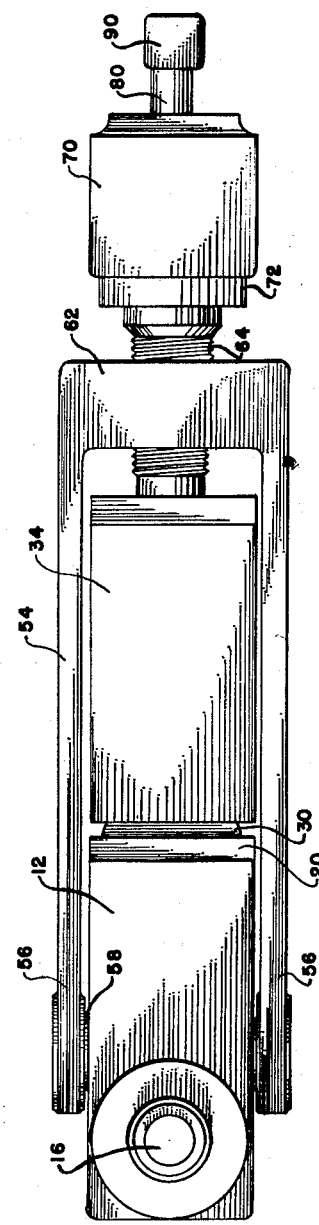
Fig. 2 is an exterior side elevation of the embodiment of the invention shown in Fig. 1.

In the foregoing, the separative movement of the clamping means has been described and it will be obvious that clamping together of the supply line members 12 and 34 will be accomplished by first seating the interfitting parts thereof and then moving the yoke 54 from its nonclamping position, similar to that shown in Fig. 4, to its clamping position shown in Figs. 1 and 2. The interlock shaft 80 will be next moved to its effective or locking position for securing the actuator 70 fast to the clamping member 64 and in which position the other end 92 of shaft 80 will be withdrawn into the member 64. The clamping member 64 will be rotated in a right hand direction until the members 12 and 34 are securely clamped together but, meanwhile, the check valve will remain closed. After clamping of the members has been completed, the handle 90 is rotated in a right hand direction and quickly moves the other end 92 of the interlock shaft 80 into engagement with the valve engaging member 48 which accordingly engages the valve ball 22 and moves it to the open position thereof shown in Fig. 1.

When this has occurred, the actuator 70 is rendered ineffective for purposes of moving the clamping member 64 in either direction. It will thus be seen that the interlocking mechanism herein described automatically controls the operation of the check valve in a foolproof manner incident to the separation of the clamping member 64, whereby the second member 34 cannot be separated from member 12 without the check valve first automatically being closed.

Another embodiment of the present invention is illustrated in Figs. 3 and 4, the principal distinction between this embodiment and the one shown in Figs. 1 and 2 being the specific nature of the interlocking mechanism. Referring to Fig. 3 particularly, the supply line member 12 is similar to that shown in Fig. 1 but a slightly different form of check valve is shown. In Fig. 3 for example, the check valve housing 20 and valve ball 22 are the same as in Fig. 1 but a spring 98 of uniform diameter is used and a different type of spring retaining member 100 is threaded into the inner end of the housing 20. The member 100 is provided with a plurality of fluid passage ports 102 which communicate with an annular groove 104 in which one end of the spring 98 is fitted. Also, the legs of the yoke 54 are provided with relatively straight ends 105 inasmuch as the pin 58 is positioned axially rearward of the outlet port 26 rather than to one side thereof as in the embodiment shown in Fig. 1.

The valve engaging member 48 is provided with a different type of fluid seal relative to chamber 42 than that shown in Fig. 1. As will be seen in Fig. 3, member 48 is provided with a flange 106 to which one end of a flexible bellows 107 is fixed by soldering or otherwise. The other end of bellows 107 is similarly fixed to the inner end of threaded plug 44.

As to the different type of interlocking mechanism and referring to Figs. 3 and 4, a clamping member 108 is threaded into the bight 62 of the yoke 54 and the end 110 is generally cylindrical and of a larger diameter than the threaded portion of the clamping member as is clearly shown in Fig. 3. The actuator 112 has a cylindrical opening 114 to receive the end 110 of the clamping member and a securing collar 116 is threaded to the interior of actuator 112 so as to abut the shoulder 118 formed by end 110, whereby the actuator 112 may not be moved any appreciable amount longitudinally relative to the clamping member 108.

The interlock or interlocking mechanism comprises a shaft 120 having a valve actuating end 122 and an intermediate portion provided with threads 124 similar to threads 84 of the embodiment of Fig. 1. However, these threads cooperate only with threads 126 within the interior of clamping member 108.

Mounted on the outer end of shaft 120, and relative to which said shaft is freely rotatable, is a sleeve 128 having circumferentially spaced splines 130 forming ribs therebetween and extending longitudinally of said sleeve, said splines and ribs being parallel to and the ribs projecting radially from the axis of the sleeve 128. The interior of the end 110 of clamping member 108 is provided with ribs 132 complementary to the splines 130 in sleeve 128, said ribs extending inward from the outer end of clamping member 108 any desired distance. In the present illustration, said ribs are about one half the length of the cavity 134.

The cylindrical opening 114 terminates in an annular flange 136 which surrounds the sleeve 128. The perimeter of the flange 136 is serrated to provide ribs similar to ribs 132 in both size and shape, whereby said ribs cooperate and are complementary to the splines 130 of sleeve 128.

For convenience, the outer ends of the ribs on member 128 between the splines 130 may be tapered as shown in Fig. 7 to facilitate interengagement of splines 130 with the ribs 132 in actuator 112 and end 110 of clamping member 108 when sleeve 128 is moved outward upon rotation of interlock shaft 120 in a left hand direction. Rotation of shaft 120 is effected by handle 138 which is fixed securely to said shaft by nut 140.

In the position of the interlocking mechanism shown in Fig. 3, the actuator 112 is effectively made fast to clamping member 108 so that the latter may be rotated by the actuator in either clamping or unclamping directions. However, as in the embodiment shown in Fig. 1, when the actuator is so fixed to the clamping member, the interlock shaft 120 has its valve actuating end 122 withdrawn to a position where valve engaging member 48 is in a position to permit the check valve to close as shown in Fig. 3. After the second member 34 has effectively been clamped to supply line member 12 by clamping member 108, as shown in Fig. 3, the check valve may then be opened by rotating the handle 138 in a right hand direction so as quickly to move interlock shaft 120 inward and cause the valve actuating end 122 thereof to move member 48 so as to engage valve ball 122 and move it away from the seat of outlet port 26, whereupon the position of the check valve will be similar to that of the check valve shown in Fig. 1. However, incident to accomplishing this, the sleeve 128 also has been moved inward so that the splines thereon have disengaged the ribs on actuator 112. The actuator thereupon is rendered ineffective for purposes of rotating clamping member 108 and the actuator 112 is then ineffective, being merely freely swivelled on the clamping member 108 under these conditions.

As in regard to the embodiment shown in Fig. 1, the mechanism illustrated in Fig. 3 is a foolproof means for causing the check valve in member 12 to close automatically upon actuating the interlocking mechanism so as to render the actuator 112 operative to loosen the clamping member 108 from its clamping position when it is desired to disconnect second member 34 from member 12. While the embodiment shown in Fig. 3 has differences in details in the interlocking mechanism and the manner in which the actuator is connected to the locking member as compared to the embodiment shown in Fig. 1, the operation of said embodiment is the same as that shown in Fig. 1.

Assuming that the present invention is embodied in a fuel burner and supply line for an oil fired furnace 14 as shown in Fig. 5, when the fuel burner 14 is to be removed from the furnace, the handle 138 shown in said figure is first operated in a direction to move the interlock shaft 120 outward and thereby permit the check valve of member 12 to be closed. Such movement of the interlock shaft renders the actuator 112 effective to rotate the locking screw 108 sufficiently to permit the inner end thereof to clear second member 34, whereupon the yoke 54 may be swung to the position thereof shown in Fig. 4 and the second member 34 may simultaneously be removed from member 12 when the fuel burner 40 is removed from the furnace 14.

As stated above in regard to the description of the embodiment shown in Fig. 1, the preferred operation of the mechanism in regard to removing a fuel burner is to first move the interlock shaft 120 in a direction to permit the check valve to close. A sufficient time is then allowed the fuel remaining in the outlet conduit 38 as well as the fuel within the burner itself to be consumed by the burner and the actuator 112 is then operated to effect loosening of the yoke 54 and thereafter permit second member 34 to be separated from member 12 when the burner 40 is removed from the furnace. By following the foregoing procedure and as a result of the present invention, no discharge or leakage of fuel from the member 12 may take place and the possibility of accidental fires resulting from any such leakage are obviated.

Precautionary measures to prevent the occurrence of accidental fires as well as the wasting of fuel are especially desirable in marine installations wherein a battery of fuel fired burners are usually arranged so that the burners are in close proximity to each other and should one of the burners be removed from its port in the furnace wall with either full discharge or even any substantial degree of leakage of fuel taking place, it is possible for flames in the fire box to be discharged through the open burner opening in the furnace wall, from which the burner has been removed, and ignite any fuel which has leaked or been discharged from member 12, for example, particularly where any shut-off valve in supply line 10 has not been closed. The occurrence of such accidental fires is prevented when the present invention is embodied in installations of the type just described.

From the foregoing it will be seen that the present invention provides not only a foolproof and automatically operable means for shutting off the supply of fluid in a line when it is desired to separate two interconnected portions of said line but the mechanism comprising the present invention is simple, rugged and relatively inexpensive for purposes of effecting economies in fluid leakage as well as obviating possible danger which might be caused by the leakage or other discharge of said fluid when members of the supply line are separated. While the present invention has been illustrated in conjunction with fuel supply members, it will be understood that the invention may be applied to installations in which other fluid is being conducted by the supply line without departing from the spirit of the invention.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A separable coupling comprising members of a fluid supply line having interfitting portions detachably connected together, said members having communicating fluid passage ports, a check valve movably supported by one member and operable to control the flow of fluid through the port therein, a yoke pivotally carried by said one member and normally extending over the other member but removable therefrom to permit separation of said members, a clamping member adjustably carried by the bight of said yoke and movable therethrough and normally engaging said other member to hold it locked to said one member, a manually operable actuator carried by and normally movable relative to said clamping member, an interlock carried by and movably mounted relative to said clamping member and actuator between two positions, said interlock when in one position locking said clamping member and actuator together for common movement to permit separation of said clamping member from said other member and when in the other position unlocking said actuator from said clamping member, and check valve actuating means carried by said other member and interconnected to and movable by said interlock toward and from said check valve, said actuating means being positioned automatically by said interlock to open said valve when said interlock is in said other position and permit said valve to close when said interlock is in said one position to lock said actuator and clamping member.

2. The separable coupling set forth in claim 1 further characterized by said clamping member being threadably carried by said yoke for movement toward and from said other member.

3. The separable coupling set forth in claim 1 further characterized by said actuator comprising a handle swivelly connected to said clamping member.

4. The separable coupling set forth in claim 3 further characterized by said handle being swivelly connected to the outer end of said clamping member and said interlock comprising a shaft extending axially through said clamping member and including a manually operable handle on the outer end thereof.

5. The separable coupling set forth in claim 1 in which said check valve actuating means includes a valve engageable member movably supported within said other member, and fluid sealing means between said other member and valve engageable member, said latter member being engaged by said interlock and moved thereby against said check valve to open the same when said interlock is in said other position thereof.

6. A separable coupling comprising members of a fluid supply line having interfitting portions detachably connected together, said members having communicating fluid passage ports, a check valve movably supported by one member and operable to control the flow of fluid through the port therein, a yoke pivotally connected at its end to said one member and normally extending over the other member but removable therefrom to permit separation of said members, a clamping member extending through and threadably engaging the bight portion of said yoke, the inner end of said clamping member normally engaging said other member to hold it locked to said one member, a manually operable actuator connected to said clamping member normally for free pivotal movement, a shaft rotatable within said locking member and extending longitudinally therethrough for movement axially thereof, interlocking means carried by said shaft and engageable with said clamping member and selectively with said actuator only when in one longitudinal position of said shaft to lock the actuator to said clamping member for rotation therewith when desired, check valve actuating means carried by said other member, one end of said shaft being interengageable with said check valve actuating means to hold the check valve in open position when said interlock is disconnected from said actuator, whereby said actuator may not then rotate said clamping member, and manually actuatable means on the other end of said shaft operable to move said shaft and interlocking means to the various positions thereof as desired.

7. The separable coupling set forth in claim 6 further characterized by said interlocking means being threaded and said clamping member and actuator being threaded complementarily thereto, whereby when said interlocking member has been moved to said one longitudinal position only the threads of said interlocking means are in engagement with the threads of both said clamping member and actuator to lock the same separably into a unit for movement by said manually actuatable means.

8. The separable coupling set forth in claim 6 further characterized by said interlocking means being splined longitudinally and complementarily to splines in said clamping member and actuator, whereby when said interlocking member has been moved to said one longitudinal position thereof only the splines of said interlocking member engage the splines of both said clamping member and actuator to lock the same separably into a unit for movement by said manually actuatable means.

9. The separable coupling set forth in claim 8 further including interengaging threads on said clamping member and shaft to effect longitudinal movement of said shaft relative to said clamping member and similar relative movement of said interlocking means relative to said actuator and clamping member.

References Cited in the file of this patent

UNITED STATES PATENTS

| Number | Name | Date |
|---|---|---|
| 833,143 | Wolf | Oct. 9, 1906 |
| 1,593,772 | Litster | July 25, 1926 |
| 2,271,785 | Watkins | Feb. 3, 1942 |
| 2,462,512 | Krone et al. | Feb. 22, 1949 |
| 2,543,589 | Newcomb | Feb. 27, 1951 |